(12) United States Patent
Aguilar

(10) Patent No.: US 10,669,026 B2
(45) Date of Patent: Jun. 2, 2020

(54) LIFT CELL MODULES AND LIFT PODS

(71) Applicant: Albert Aguilar, Zapopan (MX)

(72) Inventor: Albert Aguilar, Zapopan (MX)

( * ) Notice: Subject to any disclaimer, the term of this patent is extended or adjusted under 35 U.S.C. 154(b) by 265 days.

(21) Appl. No.: 15/088,950

(22) Filed: Apr. 1, 2016

(65) Prior Publication Data

US 2017/0283055 A1     Oct. 5, 2017

(51) Int. Cl.
*B64C 39/08* (2006.01)
*B64C 39/06* (2006.01)

(52) U.S. Cl.
CPC ............ *B64C 39/08* (2013.01); *B64C 39/062* (2013.01)

(58) Field of Classification Search
CPC ....... B64C 39/08; B64C 39/062; B64C 15/12; B64C 29/0083; B64C 29/0041; B64C 29/00; F01D 25/285; F05D 2230/68
USPC ........................................................ 137/15.2
See application file for complete search history.

(56) References Cited

U.S. PATENT DOCUMENTS

| | | |
|---|---|---|
| 1,714,609 A | 5/1929 | Massey |
| 1,787,321 A | 12/1930 | Orr |
| 1,858,341 A | 5/1932 | Richart |
| 2,026,482 A | 12/1935 | Mattioli |
| 2,380,535 A | 7/1945 | McDevitt |
| 2,532,899 A | 12/1950 | Dubost |
| 2,924,400 A | 2/1960 | Ruget |
| 2,938,680 A | 5/1960 | Greene et al. |
| 2,990,140 A | 6/1961 | Mazelsky |
| 3,028,121 A | 4/1962 | Klapproth |
| 3,061,242 A * | 10/1962 | Zurawinski ......... B64C 29/0033 244/23 A |
| 3,092,354 A | 6/1963 | Alvarez-Calderon |
| 3,107,071 A * | 10/1963 | Wessels ................ B64C 39/001 180/129 |
| 3,260,482 A * | 7/1966 | Stroukoff ................ B64C 27/82 244/17.19 |
| 3,273,829 A | 9/1966 | Elstone |
| 3,347,497 A | 10/1967 | Mullins |
| 3,451,645 A | 6/1969 | Wolcott |
| 3,465,988 A | 9/1969 | Orr |
| 3,545,701 A * | 12/1970 | Bertin ....................... B64C 9/38 244/12.3 |
| 3,847,368 A * | 11/1974 | Sakal, Jr. .............. B64C 23/005 244/13 |
| 3,883,094 A | 5/1975 | Mederer |

(Continued)

FOREIGN PATENT DOCUMENTS

| | | | | |
|---|---|---|---|---|
| CH | 580752 A5 * | 10/1976 | ............. | B64C 29/00 |
| DE | 2657714 A1 * | 6/1978 | ............. | B64C 39/08 |

OTHER PUBLICATIONS

Oster, DE 2657714, English translation, Jun. 1978. (Year: 1978).*

*Primary Examiner* — Magdalena Topolski

(74) *Attorney, Agent, or Firm* — Greensfelder, Hemker & Gale, P.C.; Joseph A. Fuchs

(57) ABSTRACT

A lift cell module is disclosed having a housing with an air inlet, an air outlet and an air duct connecting them, the housing having a generally circular inner wall having an axis and the inner wall being mounted for rotation about the axis. A plurality of radially disposed lift cells including winglets having opposed ends are connected to the inner wall, each of the winglets being vertically spaced and extending parallel to one another. The lift cell module further including a member connected to the housing for applying a motive force to rotate the inner wall.

19 Claims, 20 Drawing Sheets

(56) References Cited

U.S. PATENT DOCUMENTS

| | | | |
|---|---|---|---|
| 4,378,922 A | 4/1983 | Pierce | |
| 4,469,294 A * | 9/1984 | Clifton | B64C 29/0025 244/10 |
| 4,498,645 A | 2/1985 | Hardy | |
| 4,555,079 A | 11/1985 | Harvell et al. | |
| 4,641,800 A | 2/1987 | Rutan | |
| 4,709,879 A | 12/1987 | Stafford | |
| 4,757,962 A | 7/1988 | Grant | |
| 4,828,203 A * | 5/1989 | Clifton | B64C 29/0025 244/12.3 |
| 4,976,349 A | 12/1990 | Adkins | |
| 5,180,119 A | 1/1993 | Picard | |
| 5,433,400 A * | 7/1995 | Singhal | A63H 27/00 244/12.1 |
| 5,542,625 A | 8/1996 | Burhans, Jr. et al. | |
| 5,765,776 A | 6/1998 | Rogers et al. | |
| 5,901,925 A | 5/1999 | McGrath et al. | |
| 6,045,095 A | 4/2000 | Parrish, IV | |
| 6,561,456 B1 * | 5/2003 | Devine | B64C 29/0025 244/12.1 |
| 6,644,598 B2 | 11/2003 | Glezer et al. | |
| 7,918,416 B2 * | 4/2011 | Yoeli | B64C 29/0025 244/23 A |
| 2002/0109043 A1 | 8/2002 | Li | |
| 2005/0178881 A1 * | 8/2005 | Yoeli | B64C 29/0025 244/12.1 |
| 2007/0034734 A1 * | 2/2007 | Yoeli | B64C 27/20 244/12.1 |
| 2011/0215191 A1 * | 9/2011 | Gramling | B64C 15/00 244/12.2 |
| 2013/0140404 A1 * | 6/2013 | Parks | G05D 1/102 244/23 A |
| 2013/0181095 A1 * | 7/2013 | Akhmejanov | B64C 39/00 244/23 C |
| 2018/0044012 A1 * | 2/2018 | Groninga | B64C 29/0033 |

* cited by examiner

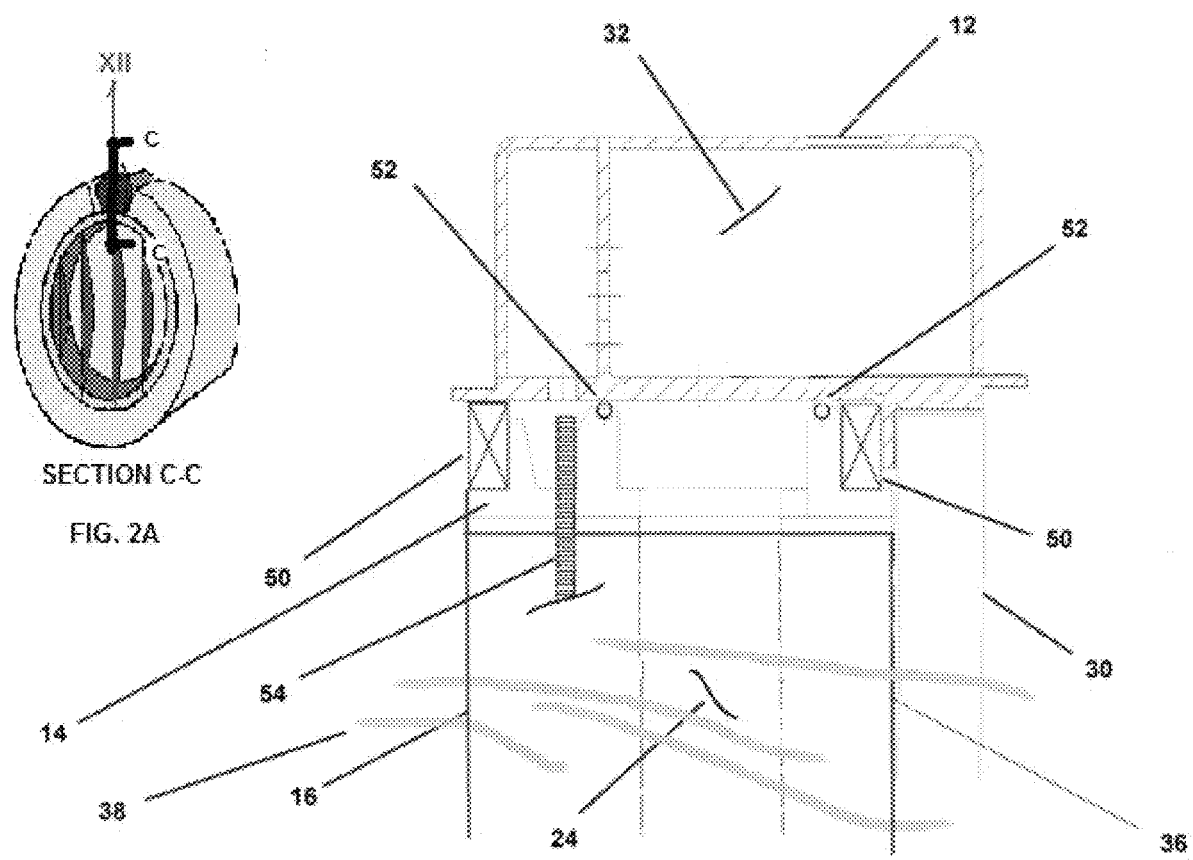

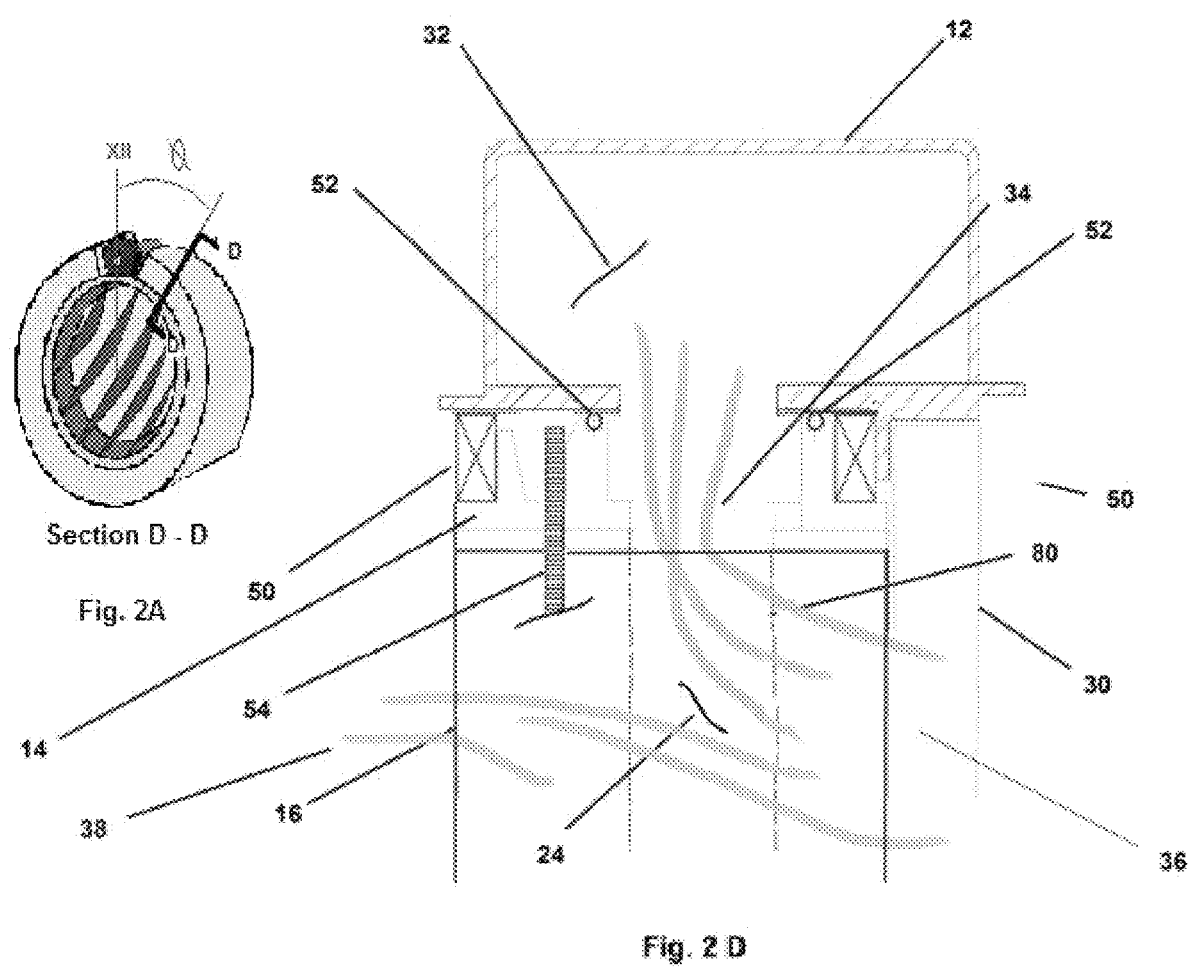

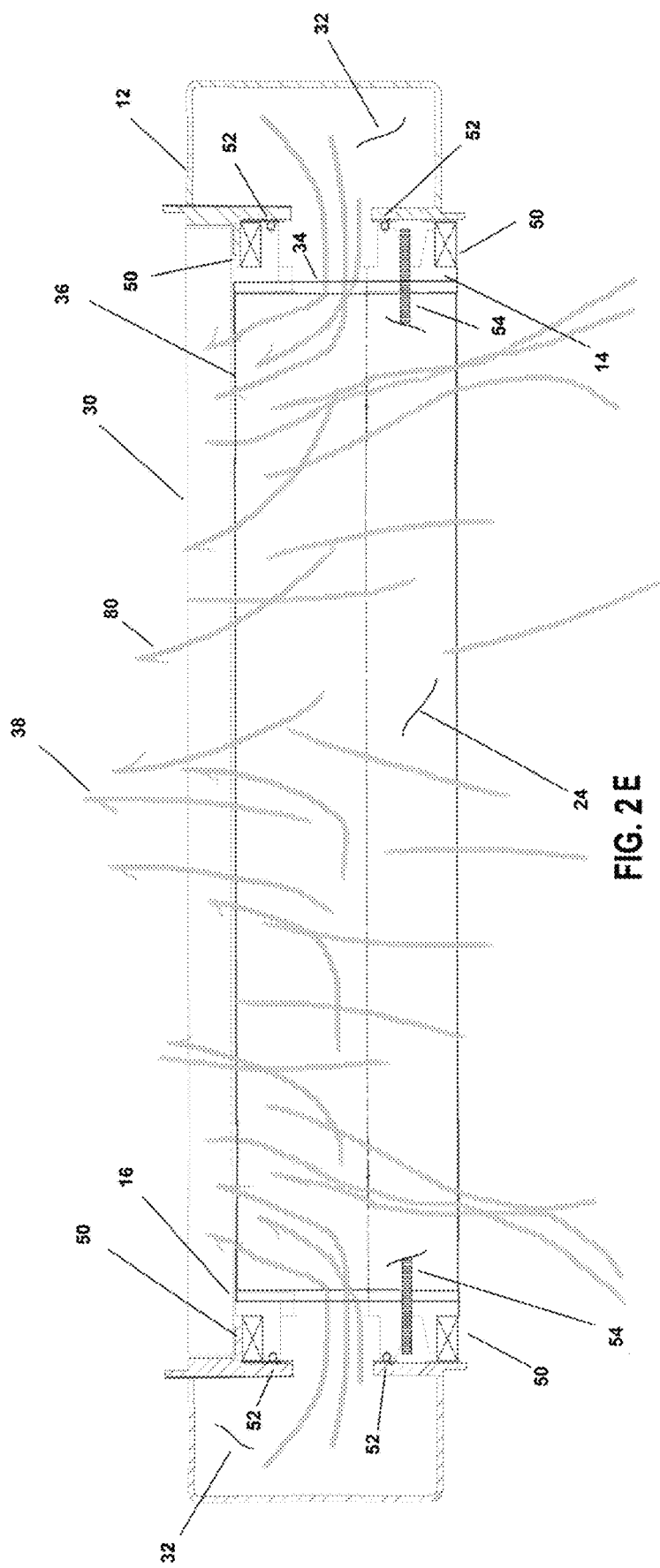

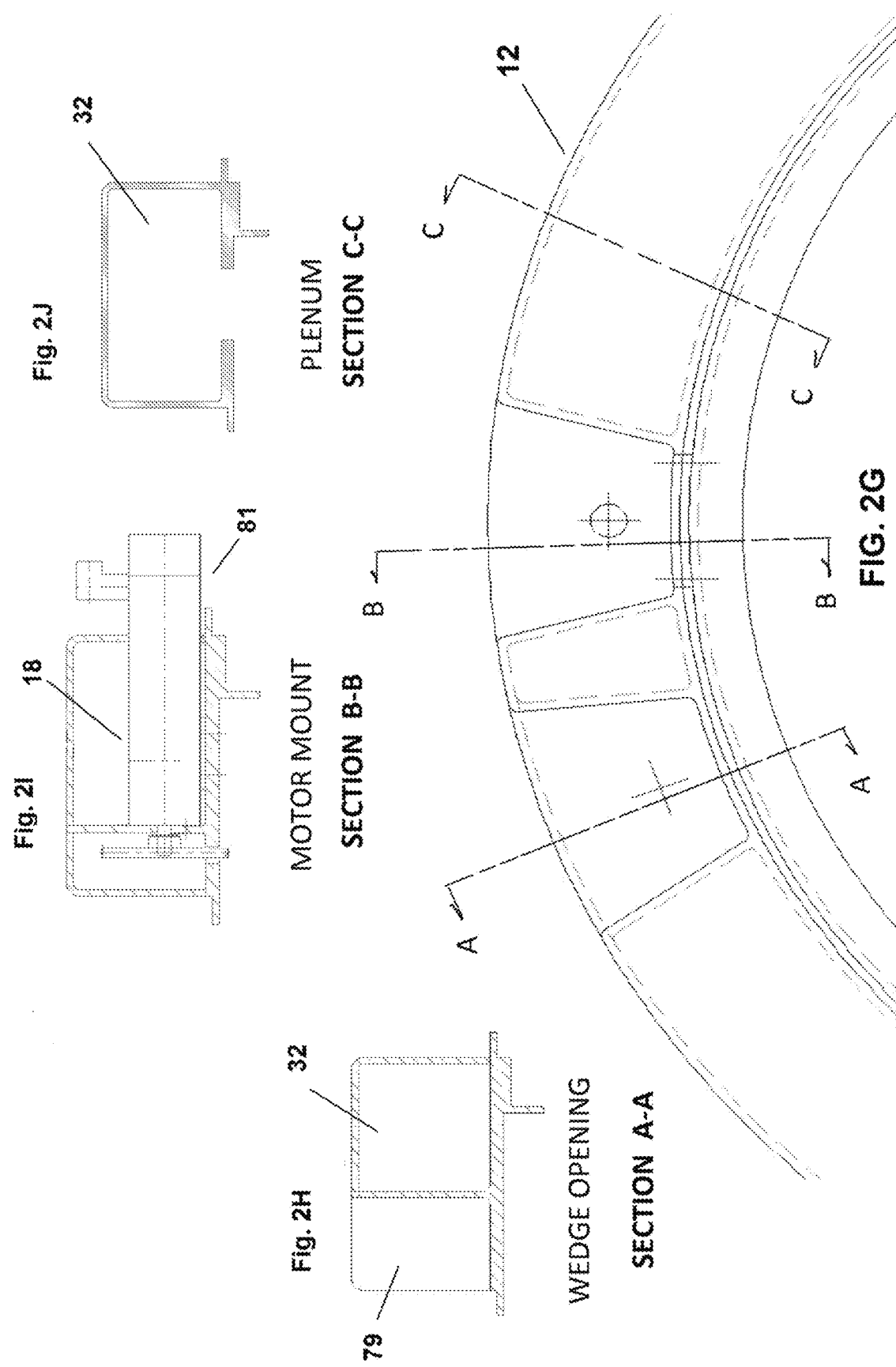

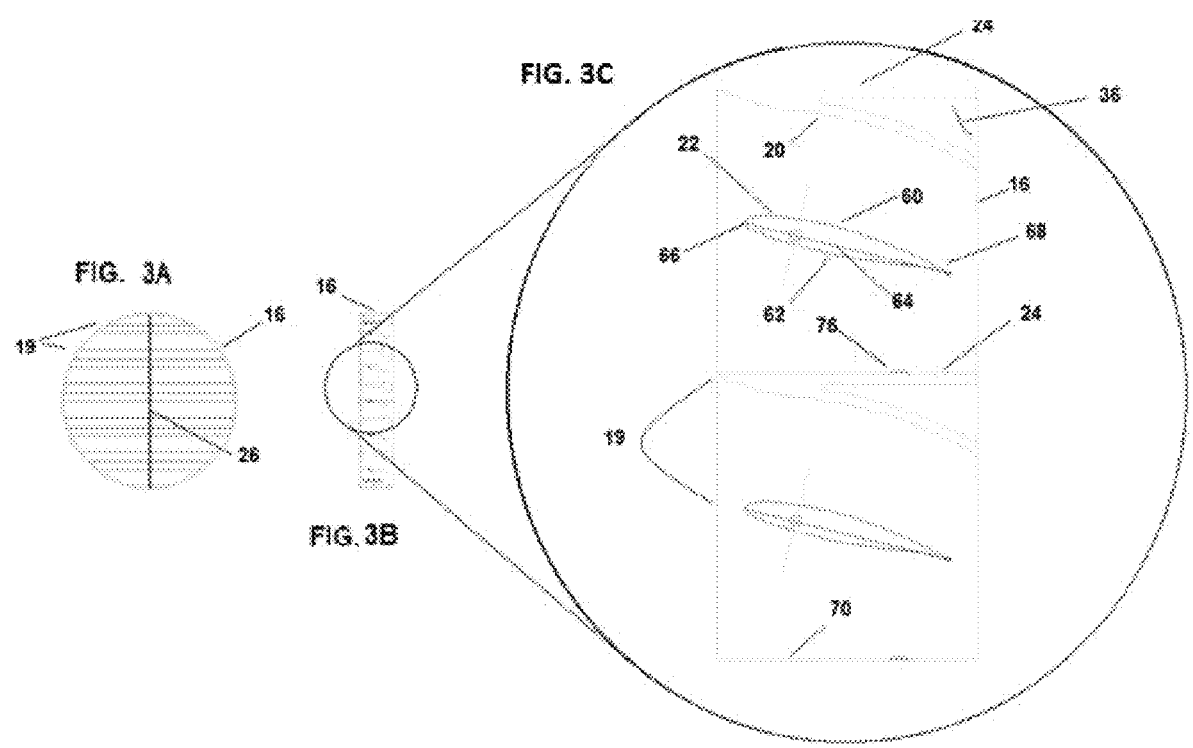

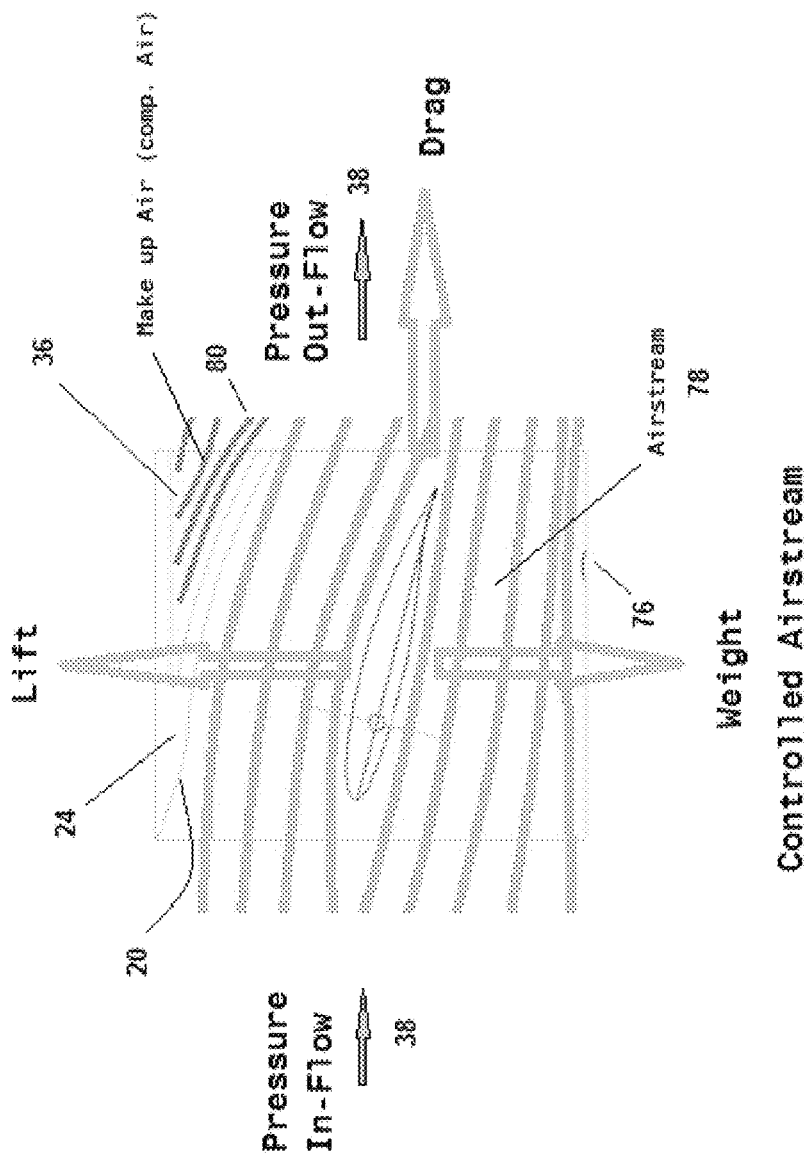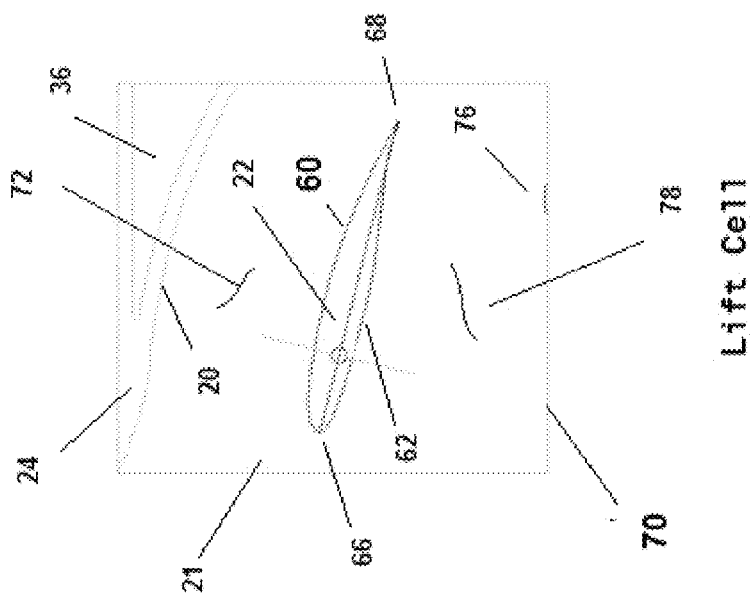

Ordinate dimensions Chord= 1.000

|  | Top Ord. | Bottom Ord. |
|---|---|---|
| Min | 0.4821 | 0.4897 |
| Max | 0.5407 | 0.7865 |
| Avg. | 0.5026 | 0.6028 |

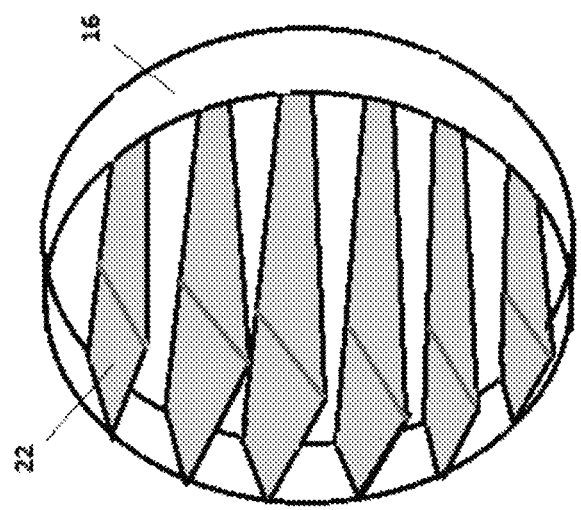
FIG. 6E Delta - Straight Wing
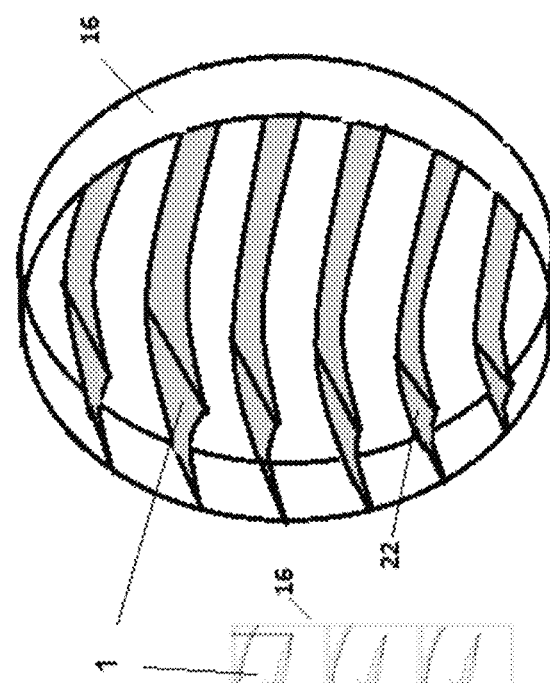
FIG. 6D Delta - Curved Wing
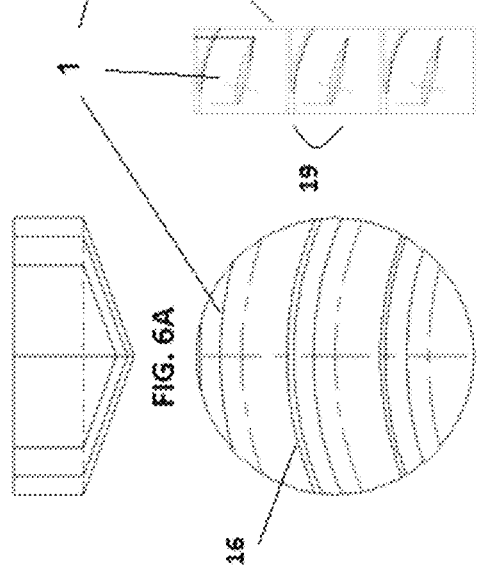
FIG. 6A Lift Cell Disk - Delta Wing Disk Configuration
FIG. 6B Curved - Delta Wing
FIG. 6C

| Types of winglettes | Number of Cells/Disk | Scale model | Sped = 200 mph | Real Size Model | Speed = | 684.5 mph |
|---|---|---|---|---|---|---|
| | Scale Model | Ducted Diameter= 4.6 Inches | | Lift Cell Diameter=53.13 inches | | |
| | | c= 3.3 cm = 1.30 in. | | c= 5.675" | | |
| | | Lift (kgf) | Ratio | Lift (kgf) | Ratio | |
| *Wing: Straight (Straight Foil)* | 7 | 4.93 | 1.00 | 9457.49 | 1.00 | |
| *Wing: Curved (Straight Foil) (Winglett Radius: 6.5 Inches)* | 7 | 5.04 | 1.02 | 9596.09 | 1.01 | |
| *Swept Back Wing: (Straight)* | 3 | 4.93 | 0.98 | 9256.09 | 0.98 | |
| *Delta Wing: (Straight)* | 3 | 8.32 | 1.69 | 15962.97 | 1.69 | |
| *Swept Back Wing: (Curved)* | 3 | 5.00 | 0.61 | 5736.10 | 0.61 | |
| *Delta Wing: (Curved)* | 3 | 8.48 | 1.68 | 15894.35 | 1.68 | |

*Note:*
Though the ratio between types of wings results may
appear to show that one configuration is better
than another; however its best to test winglet configurations in a wind tunnel (or scale
model) to see which type configuration either presents
a better airflow or produces more Lift (Resultant Vector
Force). It may mean that a curved wing configuration
appears to be better than a straight configuration from a design
vantage point but the actual wind tunnel may prove differently.

Regarding lift cell number in a given Lift Cell Disk (Diameter), it must be kept in mind that larger
airfoil sizes like those of Delta wings prevent putting in
more lift cells in a disk (diameter) if the airfoils compared are of the same size, so in this
case the given the lift cell configurations is (7) for Straight wings
and (3) for Delta wings. This is the case unless a new configuration is found for a given
disk diameter where the airfoils or the lift cells are smaller,
but now add up to seven.

Fig. 7

| Vector Disk Calculator: | | Straight Turbovec Cell | | |
|---|---|---|---|---|
| Chord | 5.68 inches | Fan Vj= 182.4 m/s | | |
| | | V= 408 mph | | |
| Line | Span (in) | Area (in2) | Lift (lbf) | Lift (kgf) |
| a | 34.15 | 137.02 | 602.420 | 273.250 |
| b | 35.63 | 202.19 | 888.930 | 403.210 |
| c | 38.65 | 219.34 | 964.310 | 437.406 |
| d | 35.44 | 201.13 | 884.261 | 401.094 |
| e | 23.59 | 133.85 | 588.458 | 266.920 |
| Total: | 157.45 | 893.53 | 3928.379 | 1781.880 |

Propeller Calculation:
*Propeller Thrust (lbf) = HP/Vmph*373* Propulsion coefficient (usu .86%)

| Systems Comparisons: | Propeller | | Jet Engine | | TurboVec Module | |
|---|---|---|---|---|---|---|
| System: | SpitFire WWII Warbird: | | JT8D-100 | | Lift Cell Module | |
| Takeoff Speed | 408.00 | mph | 480.000 | mph | 480 | mph |
| Max Takeoff weight | 4313.00 | Kgf | | | | |
| Packard Merlin 45 - 266 (Spit Fire MkXVI) | 1440.00 | HP Max | | | | |
| Propeller RPM | 3000.00 | rpm | | | | |
| Propulsion Coefficient | 86.00 | % | | | | |
| Diameter (in) | 120.00 | in | 49.20 | in | 49.2 | in |
| No. Blades | 4.00 | Blades | 34.00 | Blades | 7 | Winglets |
| Propeller Thrust lbf | 1138.24 | Lbf | 6720 | lbf | 3928.40 | lbf |
| kgf | 517.38 | Kgf | 3054.55 | kgf | 1781.90 | Lift Kgf |
| Average Blade chord | 80.00 | Percent Chord | | | | |
| Given Max Chord of propeller blade (c) | 7.50 | in | 5.68 | in | 5.675 | in |
| Blade Length (s) | 60.00 | in | 19.68 | in | 157.45 | (7) Secants (in) |
| Winglet Total Area (c*s) | 1440.00 | in2 | 3737.26 | in2 | 893.53 | in2 |
| Winglet Flight Ratio (Thrust/Blade Area) | 0.36 | Kgf/in2 | 0.80 | Kgf/in2 | 1.99 | Kgf/in2 |

Fig. 8

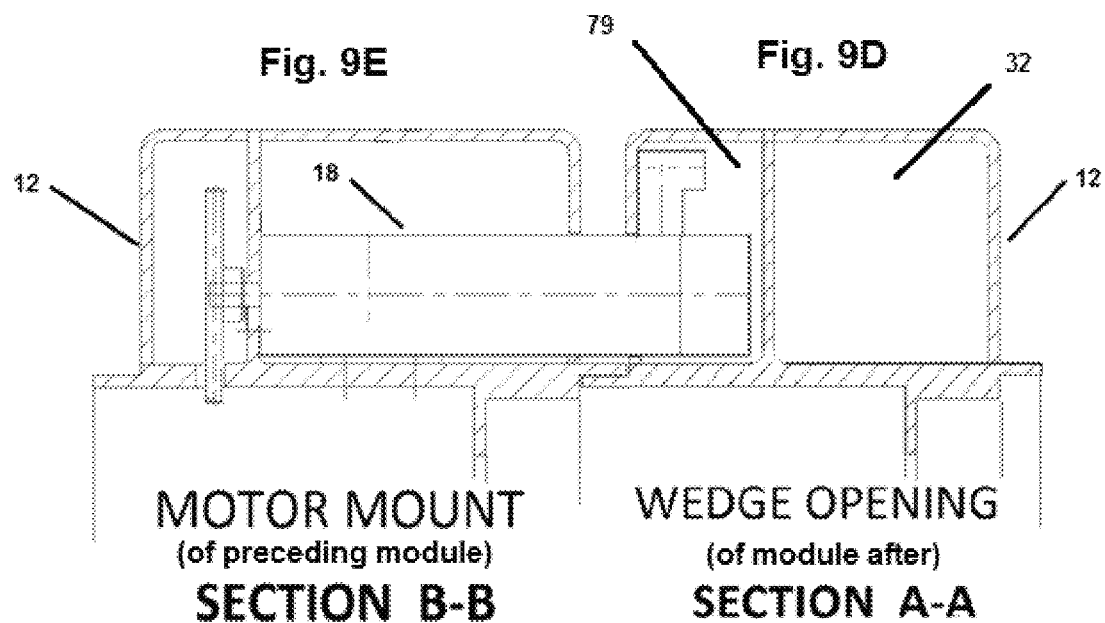
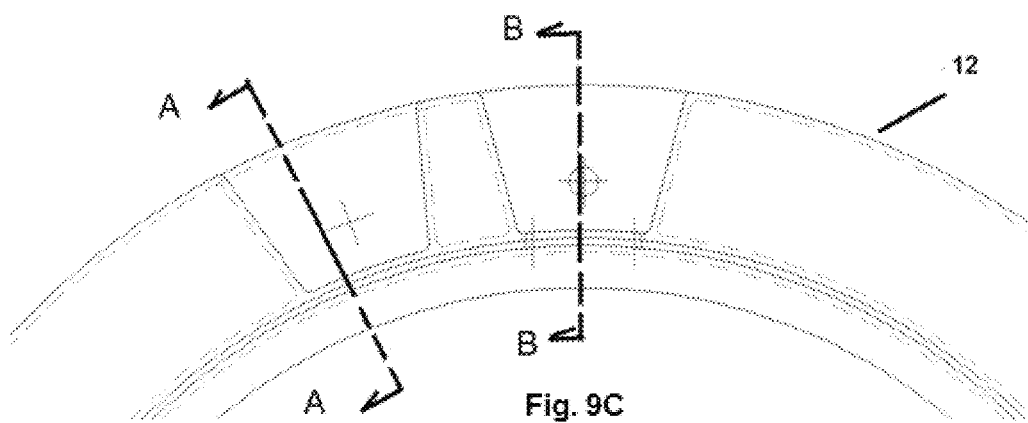

LIFT CELL MODULES AND LIFT PODS

BACKGROUND OF THE INVENTION:

Technical Field

The present invention relates to an aerodynamic lift module having a lift cell, or a plurality of lift cells in tandem within a circular disk duct that produces a resultant Lift vector force in a 360 degree field upon flowing air at velocity through the length of a duct. These lift cell modules could be set in a longitudinal series, one behind the other, along the length of a duct, to produce a working Lift Pod. This Lift Pod could be attached to a given form of an aircraft for flight.

Background Art

U.S. Pat. No. 4,976,349 shows a means of controlling airflow about an airfoil with an alternate airfoil design for conventional airplanes and open wings.

U.S. Pat. No. 5,180,119 discloses a means of aerial lift depending on the use of an air jet blown and channeled (through a nozzle and a vane) exclusively and almost tangentially over a limited segment of a rotating cylinder (a Magnus cylinder) thereby creating a useful depression and lift. The part of the cylinder's surface swept by such jet (sometime referred to as the "useful segment") is delimited upstream by a nozzle "splitting" a sheet of air almost tangentially over the cylinder and downstream by a vane which will skim the surface of the cylinder and direct the jet away from the surface of the rotating cylinder. It is possible to utilize the energy required for pumping the aforementioned jet tangentially over the cylinder much more efficiently than is the case with a classical Magnus cylinder because, instead of the cylinder being immersed totally in the pumped air flux, the jet channeled by the nozzle and the vane does not generate any useless or contrary lift, or any sizable zone of turbulence. A large number of accessory devices are also proposed in order to make this principle applicable and useful. In particular, the aforementioned basic element (i.e., cylinder, nozzle and vane) are arranged in several modules and these modules are protected from the wind by a system of walls and louvers. The attitude of an aircraft equipped with such modules is controlled mainly by moving some vanes closer to or farther from the nozzles, with a consequent variation of the surface of the useful segments and thus the lift of these modules.

U.S. Pat. No. 5,901,925 discloses the use of winglets set along the outside of the fuselage of an airplane that reportedly produce added flight controls by stabilizing airstream flow about the aircraft fuselage.

U.S. Pat. No. 2,026,482 discloses the use of cylindrical rolls, interfering/deflecting airflow about an airfoil to control the airstream and improve the generation of lift. It is reportedly an improved airfoil design to be used in the manufacture of wings intended for external use such as in conventional airplanes.

U.S. Pat. No. 2,532,899 disclosed the use of cylindrical rolls, interfering/deflecting airflow about an airfoil to control the airstream and improve the generation of lift. It is reportedly an improved airfoil design to be used in the manufacture of wings intended for external use such as in conventional airplanes.

U.S. Pat. No. 2,938,680 discloses the use of a slat for deflecting airflow about an airfoil to control the airstream and improve the generation of lift. It is reportedly an improved airfoil design to be used in the manufacture of wings intended to external use such as in conventional airplanes.

U.S. Pat. No. 2,990,140 discloses the use of winglets placed on the outside of a conventional aircraft fuselage intended to improve flight stability by controlling the airstream about the aircraft.

U.S. Pat. No. 3,092,354 discloses the use of cylindrical rolls, interfering/deflecting airflow about an airfoil to control the airstream and improve the generation of lift. It is reportedly an improved airfoil design to be used in the manufacture of wings intended to external use such as in conventional airplanes.

U.S. Pat. No. 2,924,400 discloses the use of retractable winglets set in delta form attached outside of the fuselage of a conventional airplane design to improve airflow about the airplane for flight maneuvers.

U.S. Pat. No. 3,883,094 discloses the use of winglets set in delta form attached outside of the fuselage of a conventional airplane design to improve airflow about the airplane for flight maneuvers.

U.S. Pat. No. 4,641,800 discloses a tandem or multi-winged aircraft where a primary wing system is capable of shifting a neutral point of the craft relative to its center of gravity. A secondary wing system positioned ahead of the primary one is movable fore and aft relative to the latter and angled during its excursion to counteract the neutral point shift that would be brought about by deploying the primary wing system alone thereby maintaining the neutral point at approximately its former location in at least both the cruise mode as well as the high-lift mode preferred for landing and take-off.

U.S. Pat. No. 4,378,922 discloses the use of winglets set in delta form attached outside of the fuselage of a conventional airplane design to improve airflow about the airplane for flight maneuvers.

U.S. Pat. No. 5,542,625 discloses the use of special gull curvature wings and tail to improve aircraft maneuverability and weight requirements.

U.S. Pat. No. 1,858,341 discloses a wing that houses multiple vanes (blades) that appear to be internal winglets set in a consecutive one-behind-the other fashion to reportedly improve gliding, aircraft maneuverability, and recovery from a stall.

U.S. Pat. No. 4,757,962 discloses an amphibious vehicle having a fuselage with a pair of support pods at a front end and a single support pod at the rear. Each pod has a fan therein and in accordance with another embodiment, the pods serve as floats. The vehicle has a top wing adjacent the rear and a bottom wing adjacent the front, each of which have elevator surfaces thereon. Port and starboard engines are positioned adjacent the rear of the vehicle.

U.S. Pat. No. 5,765,776 discloses a vehicular lift wing having a Coanda edge perimeter with a nozzle slot formation. Fluid ejection is directed tangentially from the full Coanda edge perimeter during translation through an ambient fluid medium. Omnidirectional control means supplies pressurized fluid to the nozzle slot formation at different azimuthal locations along the Coanda edge perimeter for selectively controlled generation of dynamic forces exerted on the wing.

U.S. Pat. No. 3,273,829 discloses the mounting of lift engines on an aircraft in order to give it a short take-off and landing capability. Such lift engines can, for example, be mounted in pods carried on the aircraft wings. Since a lift engine is provided to give upthrust, it is conventional to mount these engines with their axes vertical or substantially so.

U.S. Pat. No. 3,347,497 discloses an aircraft power plant having a plurality of gas turbine lift jets mounted in a pod for movement between operative positions in which the engine axes are vertical and inoperative positions in which the engine axes are aligned and horizontal so that the frontal area of the pod is minimized for forward flight.

There is no disclosure in these references of controlling the airflow about an airfoil using a cellular box about the airfoil. The present invention provides a box that acts as a miniature wind tunnel putting into practice the best know aerodynamic theories to optimize airfoil performance. This box is set in vertical tandem, one over the other, and set in a circular disk forming an enclosure that allows for the lift force to be managed in a radial format giving this new invention a modular design that allows for added aerodynamics maneuvers to conventional aircraft or a new form of aircraft.

These and other aspects and attributes of the present invention will be discussed with reference to the following drawings and accompanying specifications:

BRIEF DESCRIPTION OF THE DRAWINGS:

FIGS. 3A,B,C respectively are a front view, side view, and magnified view of a lift cell of the present invention.

FIGS. 4A,B respectively are a side view and a side view with air flow through a winglet and deflector of the present invention.

FIGS. 6A,B,C respectively show a top view, front view, side elevation view of a delta wing inner disk.

FIGS. 6D,E respectively show a simplified isometric view of a lift cell inner disk with a delta straight wing and a delta curved wing.

FIG. 7 is a table of the different available lift cell wing configurations, for a given inner lift cell disk (here having the same disk diameter), and showing a ratio comparison of the lift capacities among wing styles for both a scale model and a full-size model of a TurboVec Module.

FIG. 8 is a table showing a comparison of a winglet flight ratio (thrust/blade area) for a propeller engine, a jet engine and the TurboVec Module of the present invention.

Figure 1A:
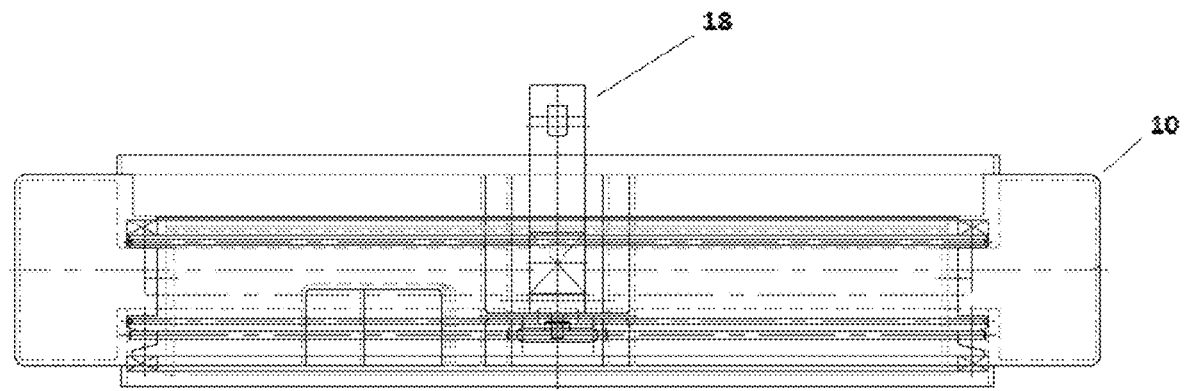
FIGS. 1A,B,C respectively are a top view, front view and side view of a lift cell module of the present invention.

DETAILED DESCRIPTION OF THE INVENTION:

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

Figure 1B:
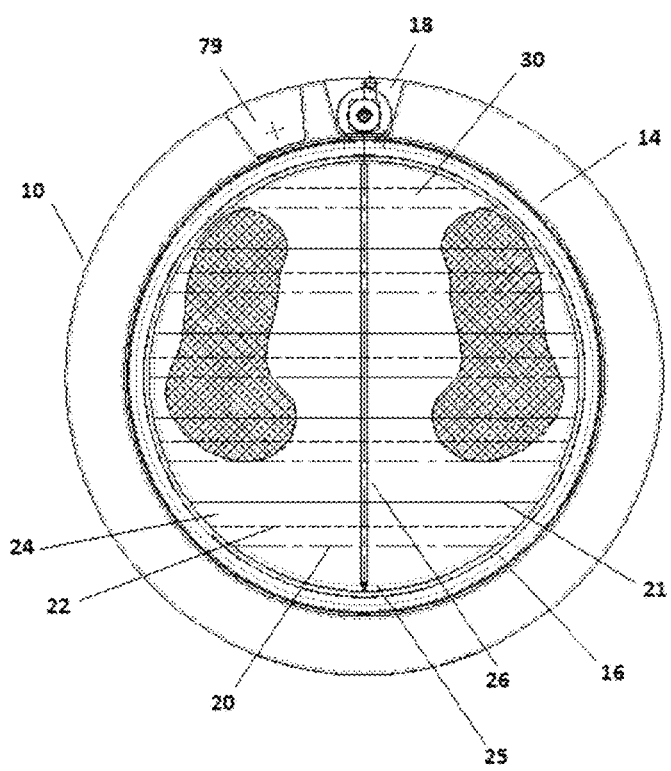

Throughout this disclosure, figures designated with a number and a letter may sometimes be referred collectively with the number alone. For example, FIGS. 1A,B,C may be collectively referred to as FIG. 1 or any individual figure in the set, say FIG. 1B may sometimes be referred to as FIG. 1.

Figure 1C:
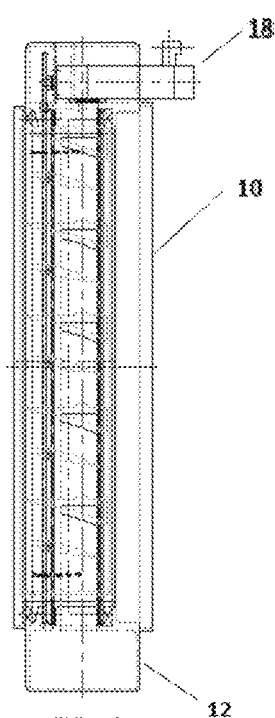

FIG. 1 shows a lift cell module 10 having a plenum 12 circumjacent an inner disk 14, an inner ring 16, concentrically mounted within the inner disk for co-rotation about a common axis in response to motive power provided by a motor 18. An air passage 21 extends through the length of the lift cell from an air inlet to an air outlet to receive and channel a pressurized air flow 38 (FIG. 2A) across surfaces to generate vertical lift, as will be described in greater detail below.

FIG. 1 shows a plurality of lift-generating triplets 19 (FIGS. 2A, 2B, 3 and 4) each having a deflector 24, a winglet 22 and a bottom surface 25,70. The triplets are vertically spaced from one another and each of these members 22,24 have opposed ends connected to the inner ring 16. While five triplets are shown, fewer or greater number or triplets can be provided without departing from the scope of the present invention. In one preferred form of the invention, slots are provided through the inner ring to accommodate the opposed ends of each of the members. Slots can be cut through the inner ring in any suitable process for example electric discharge machining (EDM). The members 22,24 are inserted into the slots and any excess material extending beyond an outer peripheral surface of the inner ring 16 is removed by cutting, grinding or other process well known to those of ordinary skill in the art leaving a smooth surface on the outer part of the inner ring 16 with the triplets secured inside.

In one form of the lift module 10, a flat plate post 26 is positioned axially inwardly of the triplets 19 and extends transversely thereto. Opposed ends of the post can similarly be inserted into slots cut through the inner ring by EDM or other suitable process. The post has a plurality of vertically placed and horizontally extending slots (not shown) one of each to receive a portion of a leading edge of the triplet members to prevent or reduce flutter of these members when exposed to the high velocity air flow 38.

Figure 9B:
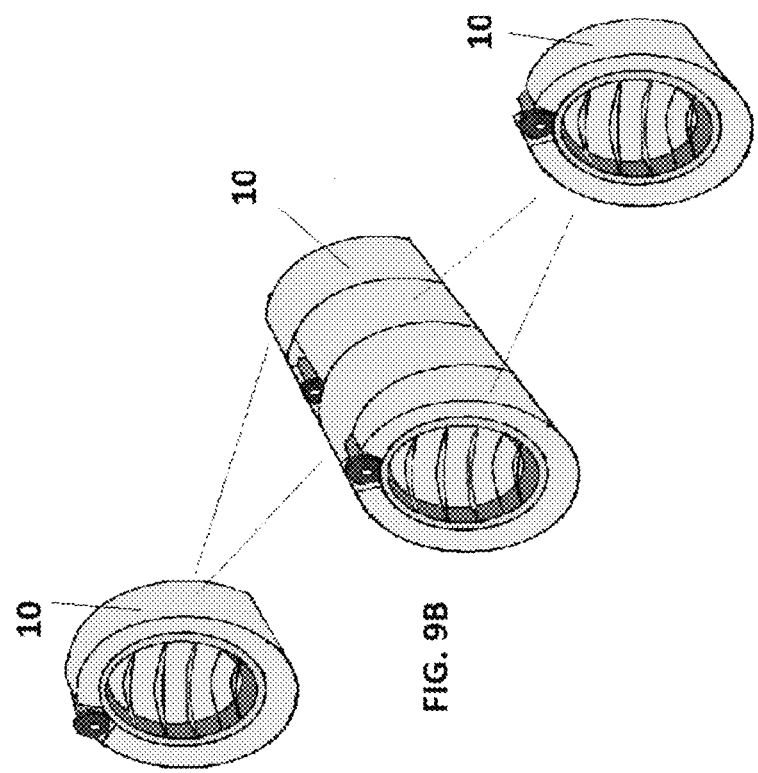
FIGS. 9A,B respectively is a side elevation view of four lift cell (TurboVec) modules in series and an isometric view of a simplified version of the four lift cell (TurboVec) modules with the drive motor alternating between the 11 o'clock position and the 12 o'clock position for a consecutive fit along the length of the pod (FIG. 10).
FIGS. 9C,D,E respectively are a front view of the plenum, a section view along line A-A of a wedge opening (FIG. 9D), and along line B-B through a motor mount (FIG. 9E).

The motor 18, for example, can be a servo motor controlled by an electronic controller (not shown). Suitable controllers can include electronic devices such as a computer or circuitry that is capable of responding to human input through a device such as a steering wheel, joystick, mouse, heads-up display, a computer keyboard, for example. The servo motor imparts force to the inner disk through, for example, a gear that contacts a surface, preferably an outer surface, of the inner disk 14. By controlling the orientation of the lift-generating triplets 19 through a range of positions or phase angles, the rotating speed and direction of the lift vector produced by the Lift Cells module 10 can be controlled by a human operator (through an onboard computer). The motor 18 is positioned at the twelve o'clock position of the plenum 12. The motor 18 can be placed at a different position about plenum 12, such as the one, two, ten, eleven o'clock positions as indicated by a "+" symbol in keystone shaped cutouts 79. The keystones cutouts 79 are also dimensioned to receive a tail end 81 of an adjacent motor when the lift modules are aligned in series. When the lift cell modules 10 are connected together in series, the motor placement will alternate from the twelve o'clock position to the different position +in adjacent lift modules, as is shown in FIGS. 9B, to provide adequate clearance between adjacent motors. Each of the motors can be independently controlled to position each of their associated inner rings 14 in a discrete angular position (see $\phi$ in FIG. 2D) to guide the lift cell modules along a desired flight path. For example, FIG. 11B shows five lift cell modules connected in series with the first lift module through the fifth lift cell modules respectively having $\phi=0°$, 25°, 35°, 45° and 60° relative to an axis taken vertically through the servo motor to achieve a flight path of the lift cell modules along the line designated as New Path. Thus, this is how the speed and direction of the lift cell modules is controlled.

An air straightener 30 is positioned axially inwardly and concentrically disposed with respect to the inner ring 16. The air straightener 30 is attached to an inner surface of the plenum and does not rotate with the inner disk 14. Preferably, the air straightener is positioned next to the inner disk 14 near the fluid outlet of the air passage 21. The air straightener 30 preferably spans the entire area of the air outlet and has a plurality of air holes. The air holes can be polygonal, oval, circular or irregular in shape. Polygonal shapes include, for example, triangular, rectangular, square, pentagonal, hexagonal, heptagonal, and octagonal. The air holes can be of a single shape across the entire area of the air straightener 30, or can include a mixture of shapes either in groups or randomly distributed or distributed in patterns. Also, the area of each air hole can vary from about 0.016 square inches to about 1.00 square inch and each of the air holes can be of approximately the same area across the air straightener or can have varying sizes forming patterns or can be randomly distributed. For example, it may be desirable to have holes of larger area on a top portion of the air straightener and smaller area holes on a bottom portion and intermediate sized holes in a central portion of the air straightener.

Figure 2A:
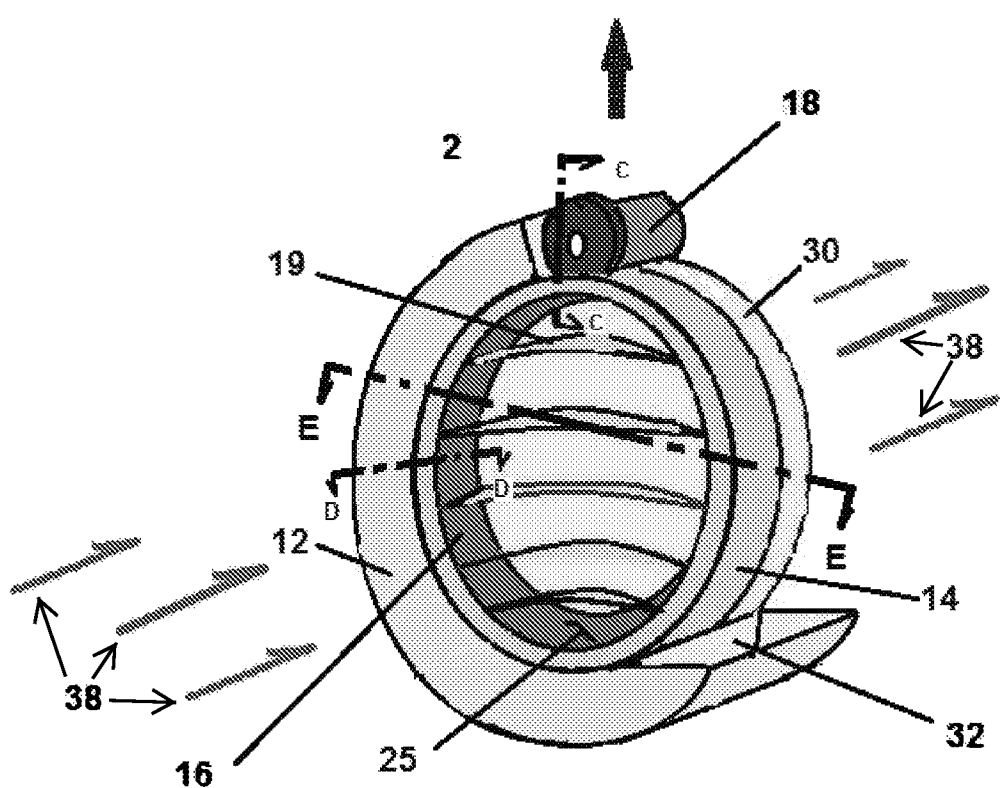
FIGS. 2A,B respectively are an isometric, simplified view (FIG. 2A), and an exploded view of a lift cell module (FIG. 2B).

FIG. 2A shows the triplets 19 as a single member for simplicity and does not show the post 26. The plenum 12 is shown, with a portion cut away, to be rectangular in cross-sectional shape and has an air chamber 32 that extends through the perimeter of the plenum. While the plenum is shown having a rectangular shape in cross-section, other shapes could be used including circular, oval, polygonal, irregular without departing from the scope of the present invention. The plenum 12 provides a flow path for make-up air 80 from a source of pressurized air through a plurality of windows 34 circumferentially spaced about and extending through the inner disk 14. The windows can be cut using EDM or other suitable technique. Each window 34 is radially aligned and is in fluid communication with an air passage 36 extending through the air straightener 30 and on to the next module's deflector surface 20. As shown in FIGS. 2D,E,F, the pressurized make up air 80 flows radially inward from the inner disk 14 windows 34 onto each of the opposing ends of the deflector plates 24 then exiting air passage 36 and joining the passing airflow 38 along the duct. When the triplets are oriented at $\phi=0°$ as shown in FIG. 2C, no make-up air is available on the central triplet as there is no exposed window 34 underneath the motor Make up air pressure is needed to compensate for a drop in static and aerodynamic pressure due to the fast moving air 38 in the fluid passage or air passage or duct 21 (FIGS. 1 and 4A) that besides having to move along the duct it has to circumvent obstacles in the duct such as other lift cell modules 10. This way a plurality of lift cell modules 10, can be place in series one behind the other without having its efficiency affected by the dropping aerodynamic pressure along the combined length of the lift cell modules 10. The make-up air can be provided from a source external from the lift cells such as bleed air from the jet engine compression stage, and through an air conduit with distribution pods such as a tank, pipe or tube, for example.

Figure 2B:
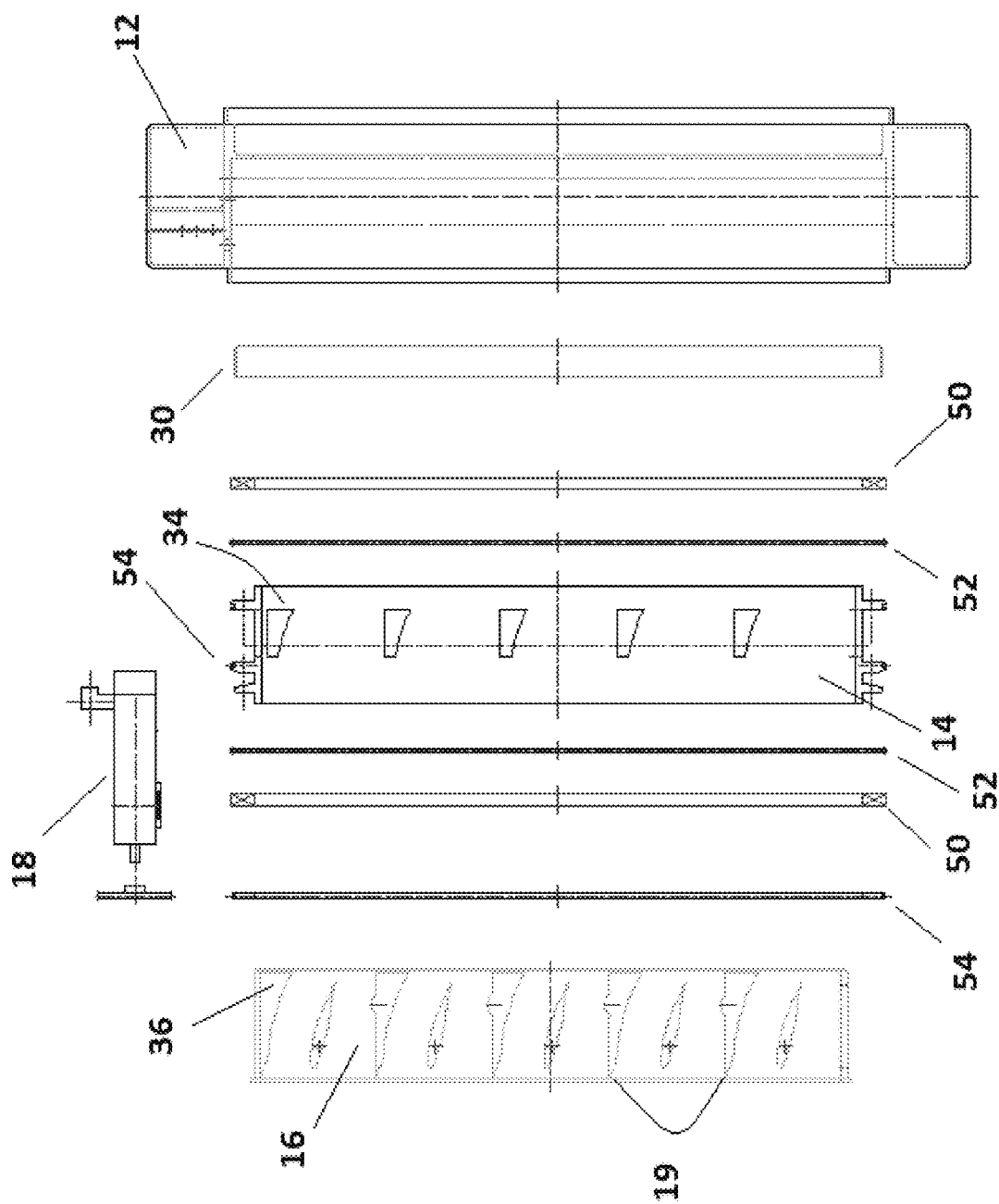
FIGS. 2C,D respectively are a side elevation view in vertical cross section taken through line C-C of FIG. 2A (FIG. 2C) with the motor 18 omitted and with the winglets oriented vertically where there is no make-up air flow and through line D-D of FIG. 2A (FIG. 2D) where the wings are in all other potions but vertical where make-up air can flow.
FIG. 2E is a top plan view of a horizontal cross-section taken through line E of FIG. 2A.
FIG. 2F is isometric view of a half-portion of FIG. 2E.
FIGS. 2G,H,I,J resepectively are a front view of a portion of the plenum 12 (FIG. 2G), a cross section view along line A-A of FIG. 2G (FIG. 2H), a cross section view through line B-B of FIG. 2G (FIG. 2I) and a cross section view through line C-C through FIG. 2G (FIG. 2J).
Figure 2F:
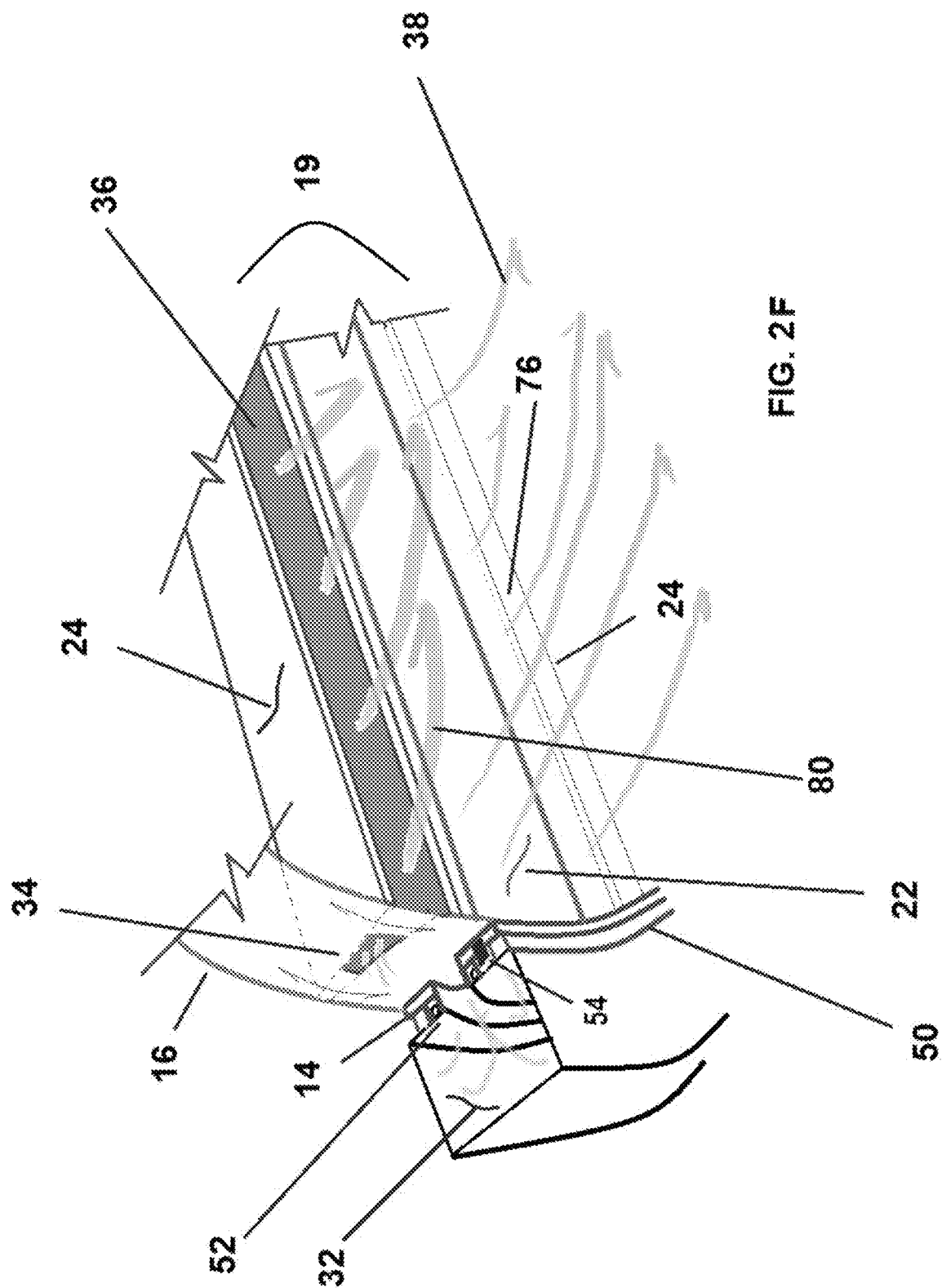

FIG. 2B and 2C shows the plenum 12 has an inner surface to accommodate the air straightener 30, a cylindrical bearings 50 that are received on an external surface of a rear portion of the inner disk 14 to allow for rotation of the inner disk 14 within the plenum 12, a pair of O-rings 52 received within projections 54 on an external surface of the inner disk 14, a second cylindrical bearing that is placed over a front end of the inner disk 14, and the inner ring 16 that is concentrically disposed within the inner disk 14 and oriented to place the windows 34 in registration with the air passages 36 and to rotate with the inner disk.

FIGS. 2G,H,I,J show three cross-sectional views of the plenum 12 including FIG. 2H showing a cross-sectional view of the keystone cutout 79 for receiving the tail end 81 of an adjacent motor and the plenum 32. FIG. 2I shows the motor with its tail end 81 and FIG. 2J shows a cross-section of the plenum 32.

FIGS. 3 and 4 show the winglet or airfoil 22 with an upper curved surface 60, a bottom surface 62 and a chord line 64. The airfoil 22 can have moveable control surfaces on a leading edge 66, a trailing edge 68, bottom surface, top surface or any combination of the same and can include ailerons, slats, flaps and spoilers. The airfoils 22 and their associated control surfaces can be fabricated from metal, plastic, fabric, composites, combinations of the same or other material well known to those of ordinary skill in the art. Suitable metals include aluminum, stainless steel, titanium, etc. In a preferred form of the invention, the main airfoil will be fabricated from Hot Isostatic Pressed Stainless Steel Casting. In one preferred form of the invention, the airfoil 22 is a NASA-LANGLEY LS(1)-0413 (GA(W)-2) AIRFOIL (ls413-il) but is not limited to this type of NACA airfoils. Volumes of studies have been done on numerous other airfoil designs that also may be successful in this invention.

In a preferred form of the invention, the air foil has an aspect ratio, that is the ratio of the length to its breadth, from about 3.50 to about 7. The breadth is the length of the chord line 64 connecting the trailing edge 68 to the center of curvature of the leading edge 66. The top surface 60 of the air foil is cambered in accordance with the following given NACA airfoil series above. The airfoil 22 preferably has a maximum thickness of 13%. The deflector 20 is an inverted surface and is positioned generally in registration with the descending arcuate profile 70 and is vertically spaced there from. This spacing between the mentioned key surfaces produces a low pressure region 72 and the high pressure region 78 (FIG. 4C) that produces the lift vector force. The airstream flow 38 travels over the top surface 60 and the bottom surface 62 keeping an approximate ½ chord distance from the bottom surface 62 to the cell surface 70 and ½ chord distance from the top surface 60 to the deflector 20.

Figure 4C:
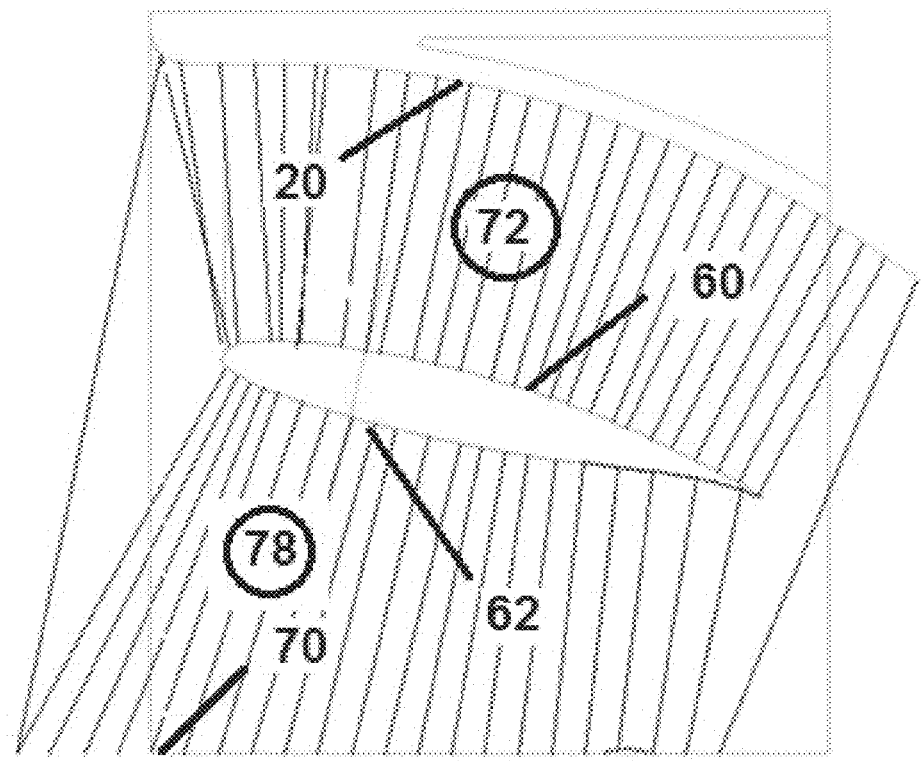
FIG. 4C is a schematic representation of a low pressure zone above a winglet and a high pressure zone below the winglet, and depicting the ordinate dimensional lines between the cell working surfaces (which are demonstrated in table form below as maximum, average and minimum ordinate dimensions).
Figure 5A:
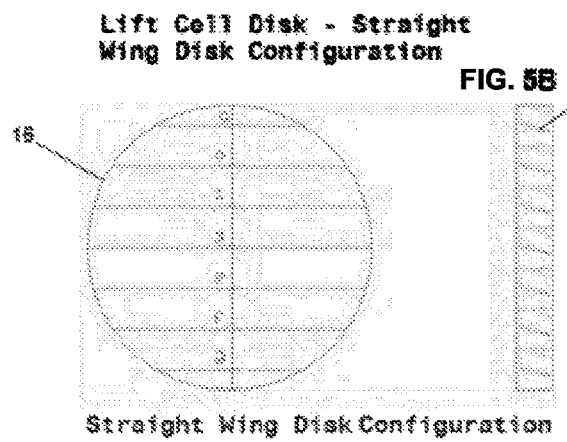
FIGS. 5A,B,C respectively are a front view, side elevational view and simplified isometric view of an inner cell disk with straight winglets in the respective lift cells.
Figure 5C:
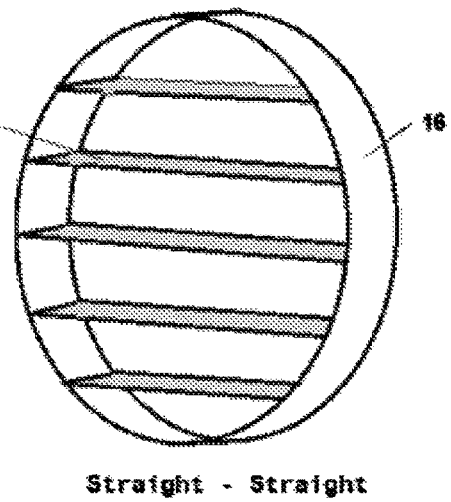
FIGS. 5D,E,F respectively are a front view, side elevational view and simplified isometric view of an inner cell disk with curved winglets in the respective lift cells.
Figure 5D:
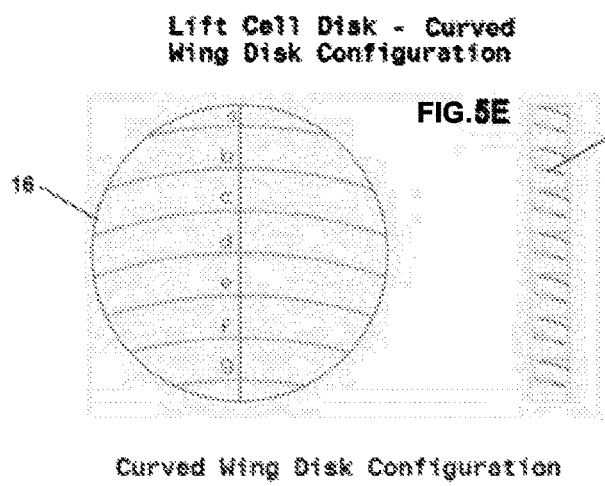
Figure 5F:
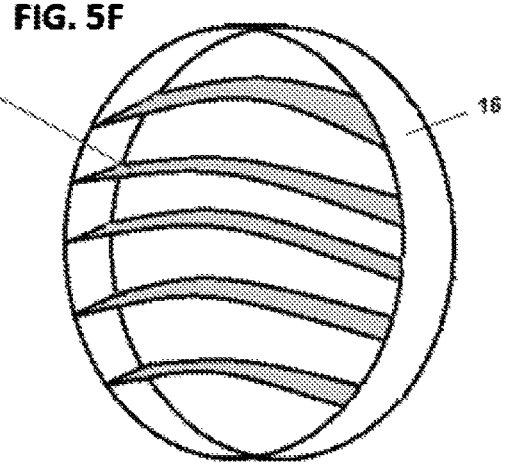

FIG. 4 shows the airfoil 22 in the airstream 38 which is constrained by the inner ring 16 and the deflector 20 and the top and bottom surface 60,62 of the airfoil 22 to flow in an ideal format. In this design the airfoil 22 is set at a 14 degree angle of attack, as per wind tunnel testing of this NACA airfoil this angle of attack is optimal to produce a coefficient of lift of 1.7, from the bottom surface 70 to the chord line 64. The ordinate distances on the top airfoil surface 60 to the deflector surface 20 ranges from 0.4821-0.5407 chord length. The ordinate distances from the bottom surface 62 of the airfoil to the surface 70 surface ranges from 0.4897-0.7865 chord length; with an average ordinate distances between surfaces 62 and 70 of 0.6028 chord length. These dimensions were chosen so as to try to provide a 1.0 to 1.5 chord distance from the deflector surface 20 to the bottom cell surface 70 as can be seen on FIG. 4C.

An airstream bump 76 is a simple obstacle (speed bump) that causes the airstream nearest the bottom surface 70 to bounce up 78 and form a concave arc in the airstream between surface 62 and surface 70. The object of this design is to optimize the flow pattern around the airfoil surfaces to maximize the lift vector force. Typically, on a fixed-wing airplane, the wing stands up against the wind in a free style, that is it is not housed in a box. Then the airfoil of the wing "sees" uncontrolled airstreams that can be turbulent and can vary based on air temperature, air speed and air flow direction among other variables. With this design the airfoil flies in an ideal controlled, enclosed environment. This means that the dimensions about the lift cell 10 can be optimized to obtain text book calculations for lift. The added advantage of this design is that flow interferences like walls, ceiling and floor, typically found in wind tunnel conditions that often end up being advantages (lift promoters), can now be taken advantage of rather than deleting the benefit from the lift equations as is customary in wind tunnels. It is also important to note that in this design make up air 80 is being provided to compensate for dynamic pressure losses usually experienced in ductwork or along wind tunnels. In this design the lift cells 10 are positioned in tandem, perpendicular to the center line of the air duct, each producing a sum of lift vector forces that constitute one single Lift force produced inside the Lift Cell Module 10 that can be controlled by changing the phase angles ϕ of each inner disk 14 independently as described above.

FIGS. 5 and 6 show alternate airfoil 22 designs. FIG. 5 show an air foil having a parallel straight wing configuration and a curved wing configuration. The lift capacity of the lift cell having a curved wing configuration (FIG. 5F) increase its lift capacity by 1% as seen in the table of FIG. 7. Flight theory holds that curved wings may be more lift generating than simple straight wings as per recent interpretations of Newton's Third Law (Inertia) in aerodynamics. One example of prior art is the way hang gliders tend to work using curved delta wings or sweptback wings. So there is lots of room to find the optimum configuration that gives the optimum lift-producing performance.

FIG. 6 shows a straight delta wing (FIG. 6D) and a curved delta wing (FIG. 6E) configurations. The lift of these configurations increase the lift capacity by 69% according to lift calculations as can be seen in the table of FIG. 7. The wing configuration allows for more or less wings for a given lift cell which can be determined through wind tunnel experimentation or through Computer Model Solution Aerodynamic Software.

FIG. 7 shows a calculations table comparing the different wing configurations described above to one another. Here the increased lift performance is 2% for a scale model and 1% for a full scale lift cell for a curved wing vs. a straight wing. Yet when going from a straight wing configuration to a straight delta wing configuration the increase in lift capacity is 69%. This effect is largely due to the increase in wing area when going from a straight wing to a delta wing. But there are known advantages in prior art wing lift performance when comparing straight wings to delta wings. What is truly significant and unexpected is the lift generated by a single lift cell 10. For a full scale model having winglet dimensions based on a Jet Turbine Models JT8D and JT8D-100 where the camber of the airfoil 60 FIG. 4, is equal to the camber (5.675 in.) of the Inflow Fan of the jet turbine JT8D/JT8D-100 jet engine. Giving the airflow to be at 684.5 mph as is does on the turbines mentioned, the lift cell 10, can produce a lift of 1781 kgf as a full scale model and on a scale model having a camber of 1.30 inches the lift produced can be as much as 4.93 kgf. This is truly a tremendous amount of lift.

The table of FIG. 8 shows a comparison between a prior art winglet system to the lift module of the present invention. The British WWII era Spitfire employs a Packard Merlin 45 engine driving a four blade wooden propeller to generate a 517 Kgf thrust force able to lift a 4,318 Kgf aircraft. Having four wooden airfoil propeller blades each measuring 60 inches in length, with a mean chord of approximately 6 inches each, this constitutes 1,440 sq in. of total winglet area. This prior art design produced a comparison performance ratio of 0.36 kgf/in$^2$. A second prior art JT8D-108 engine, when measured at the Inlet First Stage Fan, produces 1,781 kgf of fan thrust. The fan has 34 blades with each blade being approximately 19.68 inches in length to provide a total winglet area of 3,797 in$^2$. The comparison performance ratio is 0.80 Kgf/in$^2$. The lift cell 10 of the present invention with winglets of the same chord 5.675 inches as the prior art JT8D jet engine, and having the same airflow speed of 408 mph, and producing 1781.9 Kgf of resultant vector Lift force with 893.5 in$^2$ of total winglet area, lift cell 10 produces a comparison performance ratio of 1.99 Kgf/in$^2$.

Thus, surprisingly, the performance ratio of the lift cell of the present invention is 453% greater than that of the Spitfire and 148% over the JT8D jet engine. While not wanting to be bound by any particular theory, the increase in thrust, in this case a comparison to Lift (Lift=Thrust), realized by the current lift cell is due to placing an airfoil in a control cell environment ensuring an ideal airflow over controlled deflecting surfaces, static and aerodynamic pressure controls, as well as having by its nature one oncoming straight flow, instead of two in the prior art pertaining to rotating wings. This design shows via aerodynamic calculations to have a significant potential to be the next generation jet engine. When considering what makes the JT8D engine work its truly the work of many small winglets that work to bring in a large volume of air and work to compress this air into powerful oxygenated units that when mixed chemically via fuel and ignited produces a tremendous amount of thrust. Also consider that the Spitfire's propeller winglets are what truly cause that airplane wing to achieve its required velocity, overcoming the Spitfire's dead weight inertia and subsequent airplane body drag. This invention proposes that fixed winglets, configured in such a way as the Lift Cell Module 14 shows, to produce lift that based on a number of winglet lift forces sum up to one tremendous amount of lift force at typical jet turbine (turbo fan) inlet air flows (thrust).

Figure 9A:
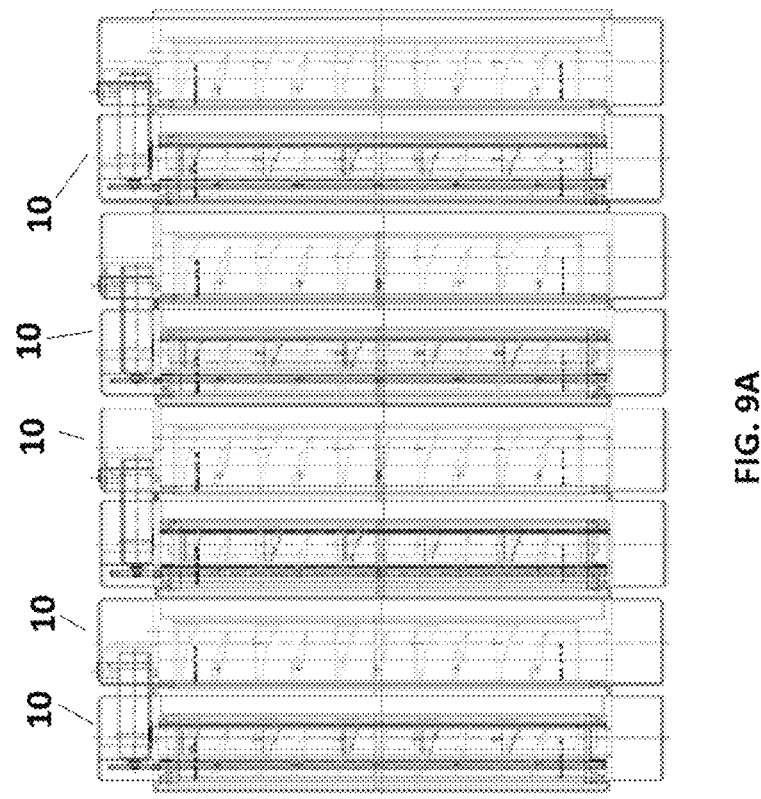
Figure 10:
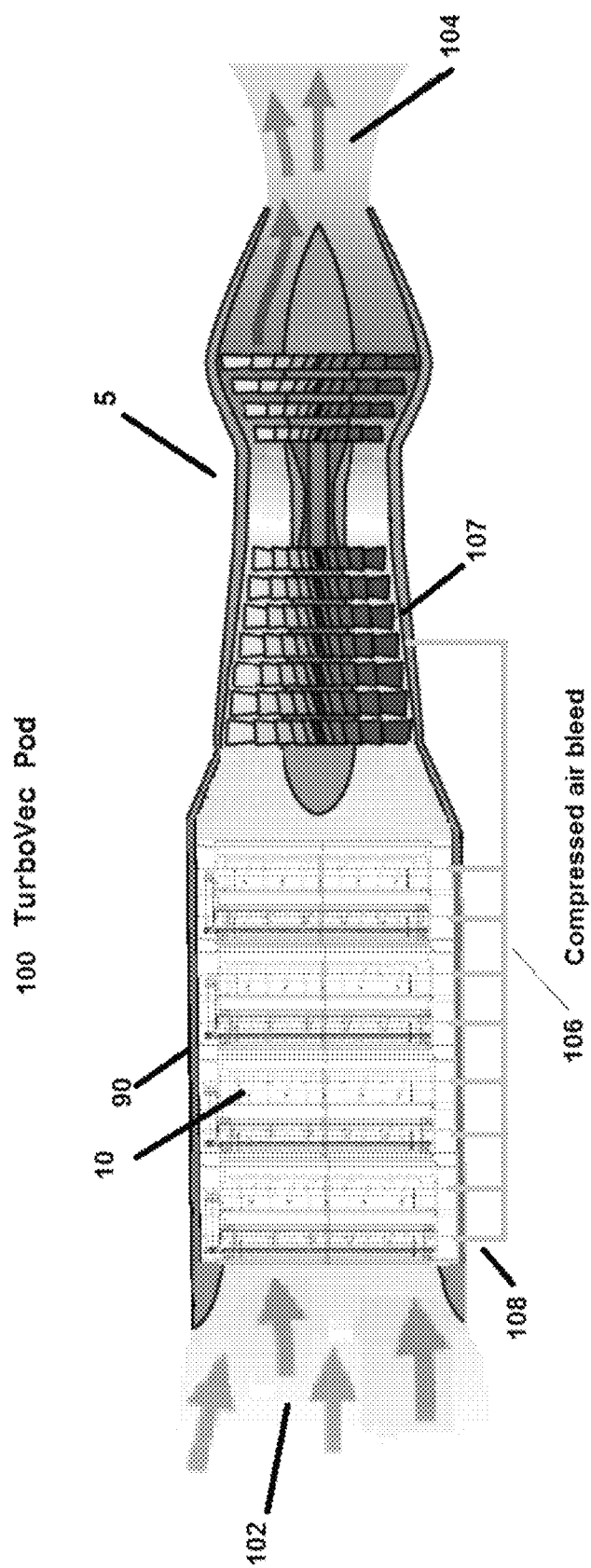
FIG. 10 shows a schematic view of a plurality of lift cell (TurboVec) modules in series inside a jet engine housing.

FIG. 9 shows a series of eight lift cell modules 10 connected in series. While eight lift cell modules 10 are shown it is contemplated that fewer or greater number of lift cell modules can be used. When mounted in series, the air outlet of one module is connected to the air inlet of an adjacent module to form a chain of lift-producing modules. With each module, as it does in this design, having 1,781.0 Kgf, the potential can be quickly realized n×(1,781) Kgf. By placing one or more lift cells inside a duct of a jet engine 90 one forms a lift pod 100 as is shown in FIG. 10. The jet engine 90 has an air inlet 102, an air outlet 104, a compressed air-bleed system 106 connecting a jet engine compression station 107 through pipes 108 to provide compressed make-up air 80 to plenum 12, as if these were compressed air storage tanks, that further administers the compressed air 80 to each of the lift cells 10 within the respective inner disk 16. When syncing the defector plates 24 to the inner disk 14 windows 34, make-up air 80 is delivered to an outlet of the deflector plates 36 to merge with the moving turbine air flow 38. When the jet engine is operating, it sucks air through the air inlet 102 and flows through the lift cell module 10 to create a resultant lift vector force. In a preferred form of the invention, the jet engine 90 is a turbo fan jet engine. Other suction sources can be utilized such as propellers or ducted fans for example.

Figure 11A:
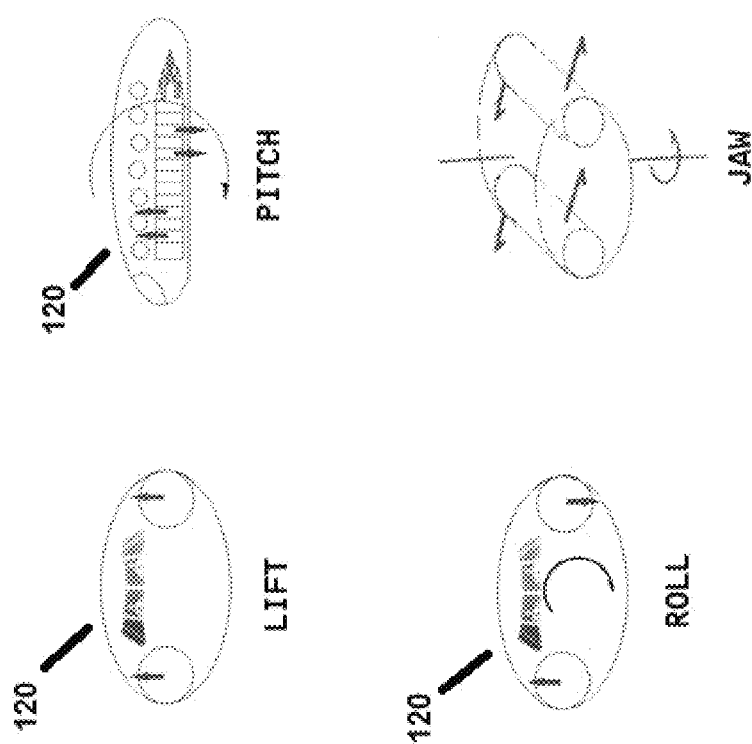
FIGS. 11A,B,C respectively show a schematic representation of lift, pitch, roll, yaw (FIG. 11A); and a simplified orientation of a series of five, for example, lift cell modules in a pod (FIG. 10) to perform a maneuver along a given geometric curve (FIG. 11B); and the phase orientation of two separate lift cell modules sitting one behind the other in series in one TurboVec pod (or in two TurboVec pods set in parallel to each other on the sides of a given aircraft) to cause altitude changes without changing the speed of the aircraft (FIG. 11C).
Figure 11:
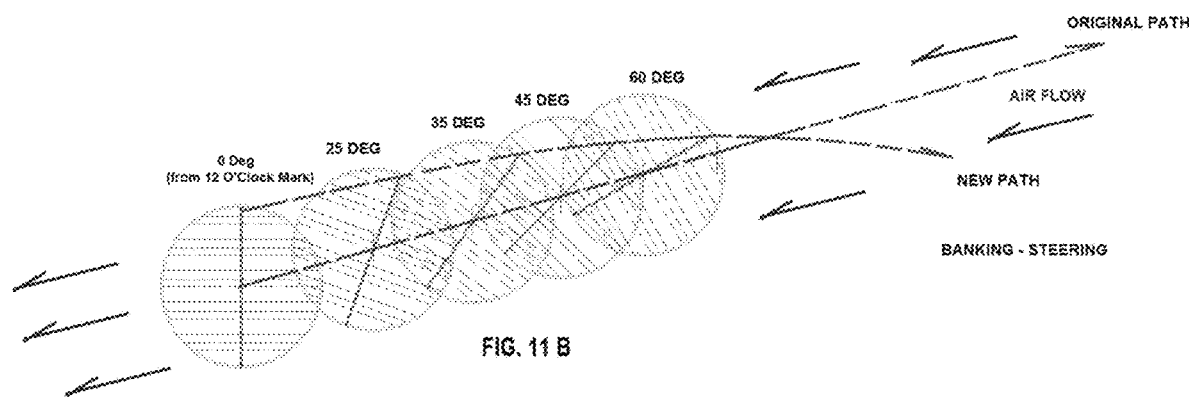
Figure 11:
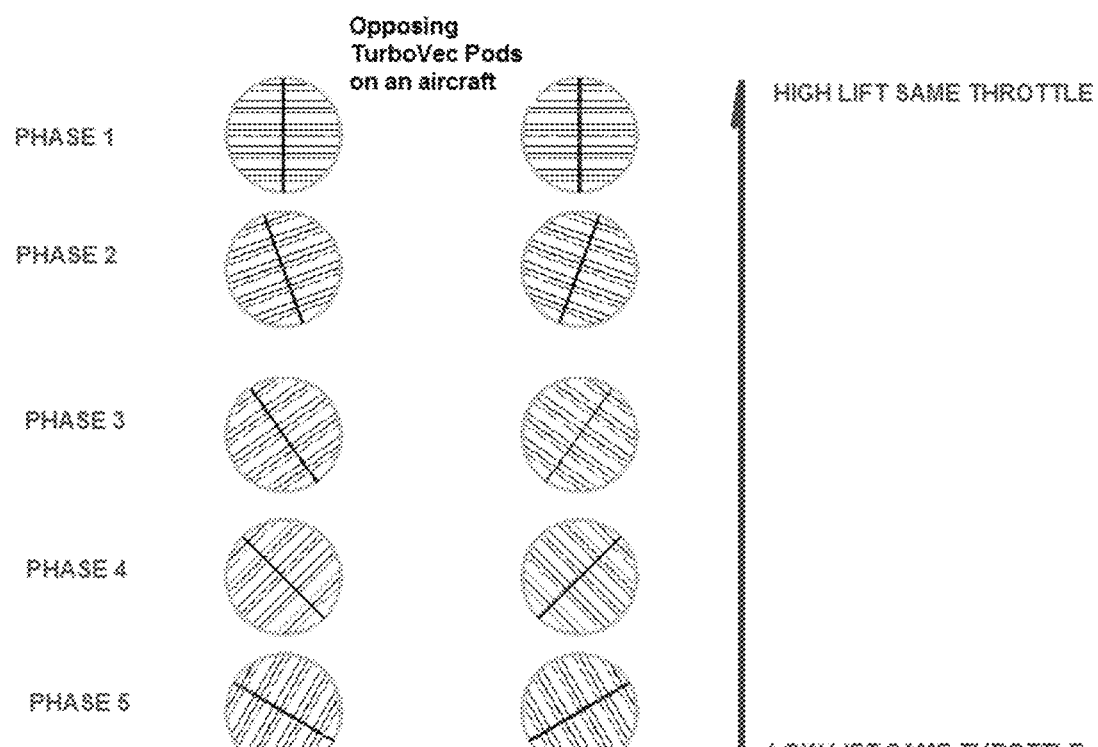

FIG. 11 shows the lift pod 100 connected to a platform or a payload such as a fuselage of an airplane 120. The lift pod 100 can achieve any geometric trajectory or flight pattern 122 conceivable. A vehicle equipped with a jet engine 5 and lift modules 10 (together making up a lift pod) can be operated to hover, to move vertically, horizontally in X and Y directions, and in horizontal and vertical directions simultaneously; or rotate in any direction and about any axis. By controlling the phase angles φ of each lift module in series, the lift forces can be additive or subtractive as shown in FIG. 11C. Thus, the lift pod can power a vehicle or a platform like a helicopter, a drone, and a fixed wing aircraft. FIG. 11B shows how lift modules in a single Lift pod can produce Lift vectors in any phase angle carrying out the stated dynamic maneuvers. FIG. 11C shows how two Lift pods being place one on each side of the aircraft in parallel as also shown on FIG. 11A can work together to cause fast or slow altitude rises or drops without having to change the craft air speed, these can together work in conjunction to produce same sense vectors to hover or lift an aircraft.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

I claim:

1. A lift cell module comprising:
   a housing having a wall having a first inner surface circumjacent an air inlet, an air outlet and an air duct connecting them for directing the flow of a first airstream;
   a generally circular ring is mounted to the first inner surface for rotational motion about a first axis through a range of phase angles, and having a second inner surface with a plurality of circumferentially spaced holes in fluid communication with a second airstream of make-up air transverse to the first airstream;
   a plurality of radially disposed winglets having opposed ends connected to the second inner surface, each of the winglets being vertically spaced and extending parallel to one another and each winglet having an upper curved surface, a length and a width, the length being greater than the width, and a second axis extends through the length and is transverse to the first axis;
   an electronic controller responding to input from a user of the lift cell module of a desired trajectory of the lift cell module and to generate an electronic signal representative of a desired phase angle within the range of phase angles of the second inner surface to achieve the desired trajectory; and,
   a member connected to the second inner surface and responsive to the electronic signal for applying a motive force to rotate the second inner surface about the first axis and to stop at the desired phase angle.

2. The lift cell module of claim 1 further comprising an air straightener in fluid communication with the housing.

3. The lift cell module of claim 1 further comprises a plurality of lift cell modules connected in series.

4. The lift cell module of claim 3 further comprising a deflector associated with each lift cell module of the plurality of lift cell modules and having a convex lower surface in registration with the upper curved surface and complementary thereto.

5. The lift cell module of claim 4 wherein the deflector has a pair of opposed ends both of which are connected to the second inner wall.

6. The lift cell module of claim 5 further comprising a first slot in the second inner wall supporting the opposed ends of the deflector.

7. The lift cell module of claim 6 further comprising a second slot in the second inner wall supporting the opposed ends of the winglet.

8. The lift cell module of claim 4 wherein one of each of the plurality of air passages is in registration with one of each of the opposed ends of each deflector.

9. The lift cell module of claim 8 wherein the housing has an inner chamber for directing a flow of pressurized air to the plurality of air passages of the second inner wall.

10. The lift cell module of claim 1 wherein the winglet can have a configuration selected from the group consisting of a straight wing, a curved wing and a delta wing.

11. The lift cell module of claim 10 wherein the delta wing can have a longitudinal axis that is straight or curved.

12. The lift cell of claim 1 wherein the winglet is configured as a NASA-LANGLEY LS(1)-0413 (GA(W)-2) AIRFOIL (ls413-il).

13. The lift cell module of claim 1 wherein the make-up air is provided from a jet engine.

14. The lift cell module of claim 1 wherein the member for supplying a motive force is a motor.

15. The lift cell module of claim 14 wherein the motor is a servo motor.

16. The lift cell module of claim 15 wherein the servo motor has a gear for contacting the ring.

17. The lift cell module of claim 1 wherein the controller is adapted to receive human input through a device selected from the group consisting of a steering wheel, joystick, mouse, heads-up display, a computer keyboard, and combinations of the same.

18. The lift cell module of claim 17 wherein the human input is entered through a joystick.

19. A lift cell module comprising:
- an annular air plenum connected to a source of pressurized make-up air to form a first air stream, the plenum having a wall defining an air duct for directing a flow of a second air stream, the air duct having a first axis, an air inlet, and an air outlet;
- a generally circular ring is mounted in the air duct for rotational motion about the first axis through a range of phase angles, and having an inner surface with a hole through the inner surface;
- a winglet having opposed ends connected to the inner surface and having a curved surface, a length and a width, the length being greater than the width;
- a deflector having opposed ends connected to the inner surface and spaced from the winglet, the deflector having an air passage along a second axis, transverse to the first axis, and in fluid communication with the first air stream via the hole;
- an electronic controller responding to input from a user of the lift cell module of a desired trajectory of the lift cell module and to generate an electronic signal representative of a desired phase angle within the range of phase angles to achieve the desired trajectory; and,
- a member connected to the inner surface and responsive to the electronic signal for applying a motive force to rotate the inner surface about the first axis and to stop at the desired phase angle.

* * * * *